Oct. 13, 1953     H. TERHUNE     2,655,002
LIQUID PRESSURE TRANSMISSION SYSTEM
Filed Sept. 11, 1952     3 Sheets-Sheet 1

INVENTOR.
HOWARD TERHUNE
BY Joseph H. Lipschutz
ATTORNEY

Oct. 13, 1953 H. TERHUNE 2,655,002
LIQUID PRESSURE TRANSMISSION SYSTEM
Filed Sept. 11, 1952 3 Sheets-Sheet 2

INVENTOR.
HOWARD TERHUNE
BY
ATTORNEY

Patented Oct. 13, 1953

2,655,002

UNITED STATES PATENT OFFICE 2,655,002

LIQUID PRESSURE TRANSMISSION SYSTEM

Howard Terhune, Alliance, Ohio, assignor to Hydropress Inc., New York, N. Y., a corporation of Delaware Application September 11, 1952, Serial No. 308,985

2 Claims. (Cl. 60—54.5)

This invention relates to liquid pressure transmission systems, and is illustrated herein in connection with counter-blow hammers and the like. More particularly, the invention is illustrated in connection with the hydraulic couplings between the upper and lower rams of such hammers.

The essential feature of the counter-blow or double-acting hammer is the upward movement of the lower ram toward the upper ram during the downward movement of the upper ram. Such relative movements of the rams were originally effected by mechanical connections between the rams, but more recently such mechanical connections have been replaced by hydraulic couplings. Piston rods connected to the upper ram operate in vertical cylinders to force liquid into a cylinder beneath the lower ram as the upper ram descends.

To provide a check for the downward movement of the upper ram in case of an overstroke, it has been the practice to provide check chambers at the lower ends of the cylinders in which the above-mentioned piston rods operate, and the manifold which connects the cylinders was attached to the lower ends of the cylinders. With this construction, should the manifold fail or the liquid otherwise leak out of the hydraulic coupling, there would be no check for the descending ram in case of an overstroke and serious damage to the machine could result. The location of the manifold at the bottom of the cylinders resulted in placing upon the manifold the extremely high pressures which are rapidly developed when the piston rods descend into the check chambers. This increased stress was placed upon the manifold bolts and flanges.

It is, therefore, one of the principal objects of this invention to provide a hydraulic coupling system for counter-blow hammers and the like which will have a check chamber that will continue to function even though the manfold has failed, and even though the main body of liquid in the coupling has been lost through leakage.

It is a further object of this invention to provide a hydraulic coupling for counter-blow hammers and the like in which the manifold bolts and flanges are not subjected to the greatly increased pressures built up within the check chambers by the descending pistons. By this arrangement the danger of failure of the manifold is reduced, and the tendency to lose liquid through leakage is also greatly reduced.

Further objects and advantages of this invention will become apparent in the following detailed description thereof.

Figure 2:
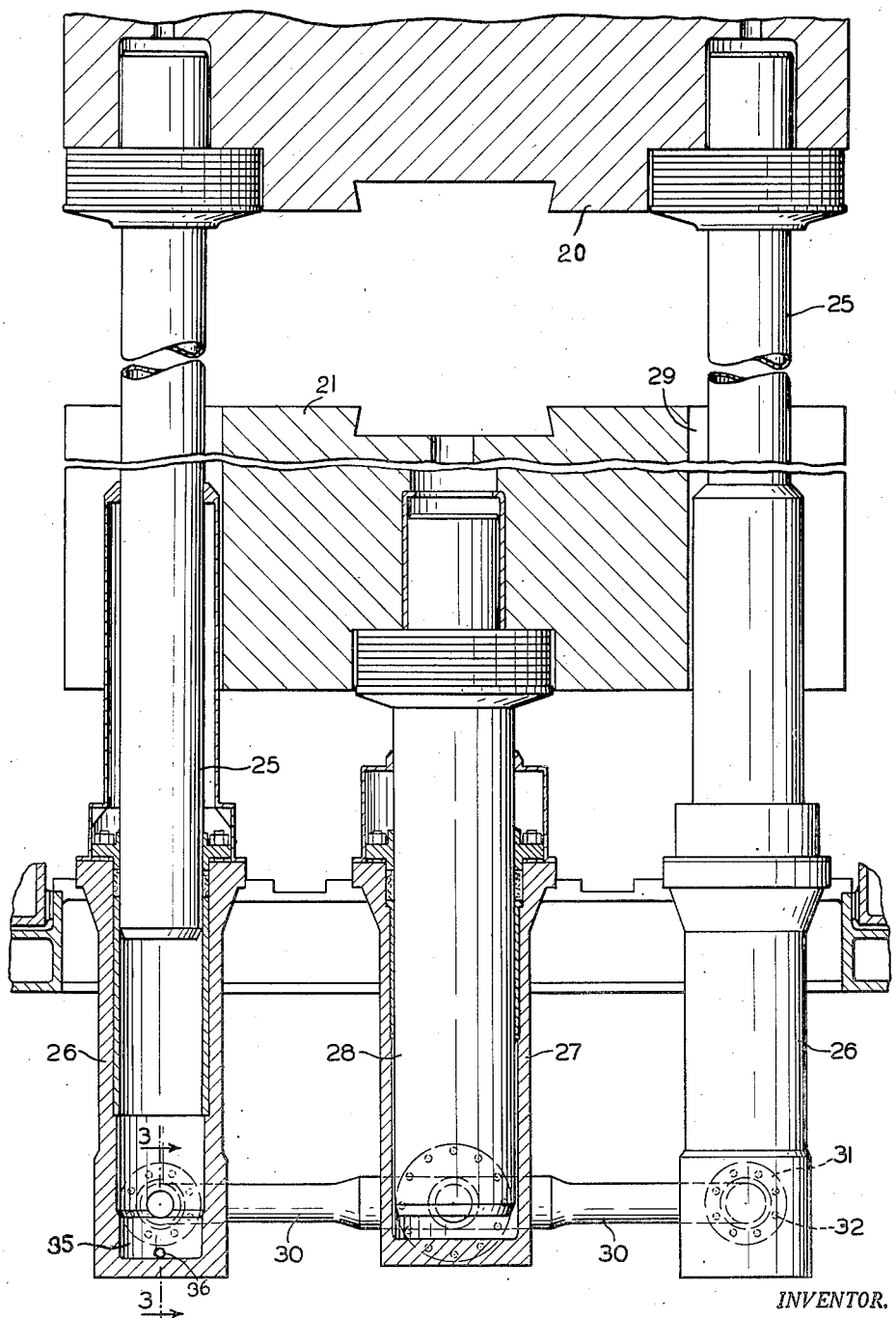
Fig. 2 is an enlarged detail, partly sectioned vertically, of a portion of the Fig. 1 machine.

Referring to the drawings, my invention is shown applied to a counter-blow hammer, but it will be apparent that it may be employed wherever a hydraulic cushion is provided at the end of a piston stroke. As illustrated, the machine comprises a bed plate 10, a plurality of stands 11 and 12 fixed to the bed plate and supporting at their upper ends a tie plate 15 and a steam cylinder 16 controlled by a throttle valve 17. The stands at opposite sides are joined by tie bars 18. Within guide bars 19 there move an upper ram 20 and a lower ram 21, and, since this is a counter-blow hammer, there are provided means for causing said rams to move in opposite directions. The movement of the ram 20 is controlled in the conventional manner by the steam in cylinder 16 controlled by throttle valve 17. The movement of ram 21 in a direction opposite to ram 20 is effected in the manner well-known in the counter-blow type of forging machine, i. e., plungers or pistons 25 carried by ram 20 operate in vertical cylinders 26, and when they descend, force liquid into cylinder 27 whose co-operating piston 28 supports the lower ram 21. Thereafter, when pistons 25 ascend, the oil is returned from cylinder 27 to the lateral cylinders 26 due to the action of the weight of ram 21. Therefore, as ram 20 is lowered and raised, ram 21 is raised and lowered, respectively. The pistons 25 are positioned in openings 29 (see Fig. 2) extending through the lower ram. The foregoing elements are well-known in the art.

Heretofore, in devices of this type, the manifold 30 connecting cylinders 26 with cylinder 27 was attached to the bottom of the cylinders 26. As a result of this construction the manifold flange 31 and bolts 32 took the full stress incident to the rapidly increasing pressure which develops when the pistons 25 descend into check chambers. This tended to cause leakage of the liquid at the bottom of cylinder 26. Furthermore, occasional failure of the manifold also caused leakage of the liquid. In either case the lower end of cylinder 26 was drained of liquid.

Figure 1:
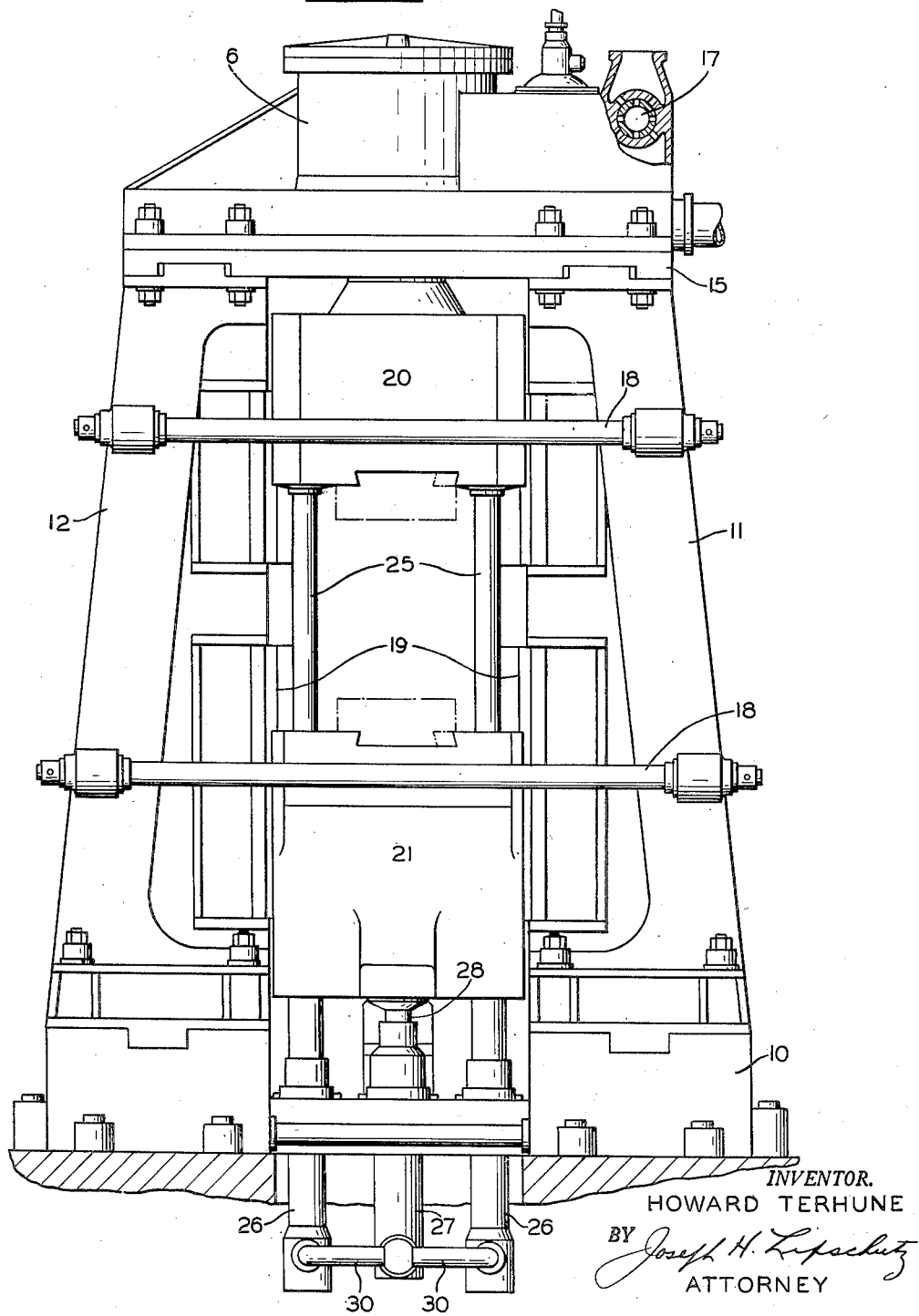
Fig. 1 is a front elevation of a counter-blow hammer having this invention applied thereto.
Figure 3:
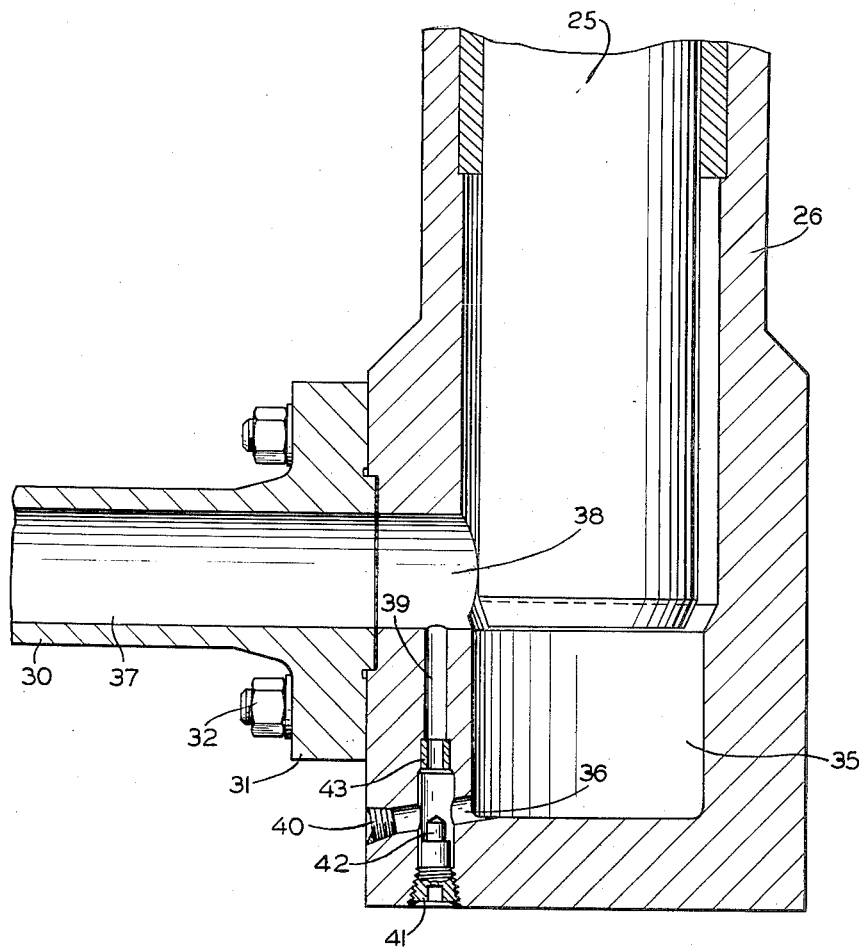
Fig. 3 is a section taken on the line 3—3 of Fig. 2 but showing one of the pistons at the end of its normal downward stroke.

Referring now to Fig. 3, each chamber 35 is normally full of liquid and acts as a check or dash-pot to prevent the pistons 25 from descending too rapidly to the bottom and damaging the machine in case of an overstroke. One of the pistons 25 is shown at the end of its normal downward stroke in Fig. 3 but an overstroke may occur, for example, if the machine is operated without any dies or work-piece between the rams. To stop the pistons 25 gradually, each check chamber is provided with an orifice check or bleeder passage 36 connected to a passage 39. However, if the chamber 35 were ever drained of liquid, the checking action of the chamber would be lost and the descending piston could then cause considerable damage.

By this invention, the check chamber continues to function even if the manifold has failed for any reason and even if leakage has occurred at the manifold flange. Furthermore, by this construction excessive stress is removed from the manifold flange and bolts. For this purpose, the manifold is connected to the side of each cylinder 26 instead of to the bottom. The passage 37 of the mainfold communicates with a passage 38 in the cylinder at a distance above the bottom of the check chamber 35 which preferably is at least equal to the minimum height of liquid in said chamber necessary to perform the normal checking function. As a result of this construction, even complete failure of the manifold and loss of all liquid flowing into the manifold will not deplete the liquid in check chamber 35 which will remain full and capable of performing its normal checking function. Furthermore, with the manifold mounted on the side of cylinder 26 above the chamber 35, it will be seen that the high pressures developed in the check chamber as piston 25 descends therein, will not place correspondingly greater stress on the manifold flange 31 and bolts 32, which will reduce the tendency to lose liquid by leakage.

The construction of passages 36 and 39 in the check chamber is such that leakage therethrough to the outside of the casing is impossible. Passage 36 is drilled through from outside the casing, and the opening to the outside is filled by a screw-threaded plug 40 which is then welded permanently in the casing. Similarly, passage 39 is drilled through from outside the casing, and the opening to the outside is filled by a screw-threaded plug 41 having an inner projection 42 extending across the passage 36. By selecting a projection 42 of suitable size, the desired flow through passage 36 can be obtained. A bushing 43 may be provided for adjusting the flow through passage 39. When these adjustments have been made, plug 41 is welded in position in the casing.

Having described my invention, what I claim and desire to secure by Letters Patent is:

1. A counter-blow hammer having an upper ram, a lower ram, means for supporting said rams for movement relative to each other, means for moving the upper ram downwardly, and means actuated by the downward movement of the upper ram for moving the lower ram upwardly, said last named means comprising a liquid pressure transmitting system including a piston operatively connected to the upper ram to move therewith, a cylinder within which the piston operates, said cylinder having a passage, a second piston operatively connected to the lower ram to move therewith, a second cylinder in which the second piston operates, said second cylinder having a passage, a manifold connecting said passages, and a check chamber at the lower end of the first cylinder, said system being filled with liquid whereby downward movement of the upper ram and the first piston will cause upward movement of the lower ram and the second piston, said manifold being connected to said first cylinder above the check chamber.

2. A device as specified in claim 1, in which the mainfold is connected to the first cylinder above the lowest point of the check chamber a distance at least equal to the minimum height of liquid in the chamber necessary to perform the checking function.

HOWARD TERHUNE.

References Cited in the file of this patent

UNITED STATES PATENTS

| Number | Name | Date |
|---|---|---|
| 885,459 | Engler et al. | Apr. 21, 1908 |
| 2,246,461 | Cannon, Jr. | June 17, 1941 |
| 2,367,248 | Vickers et al. | Jan. 16, 1945 |
| 2,403,912 | Doll | July 16, 1946 |